Figure 1:
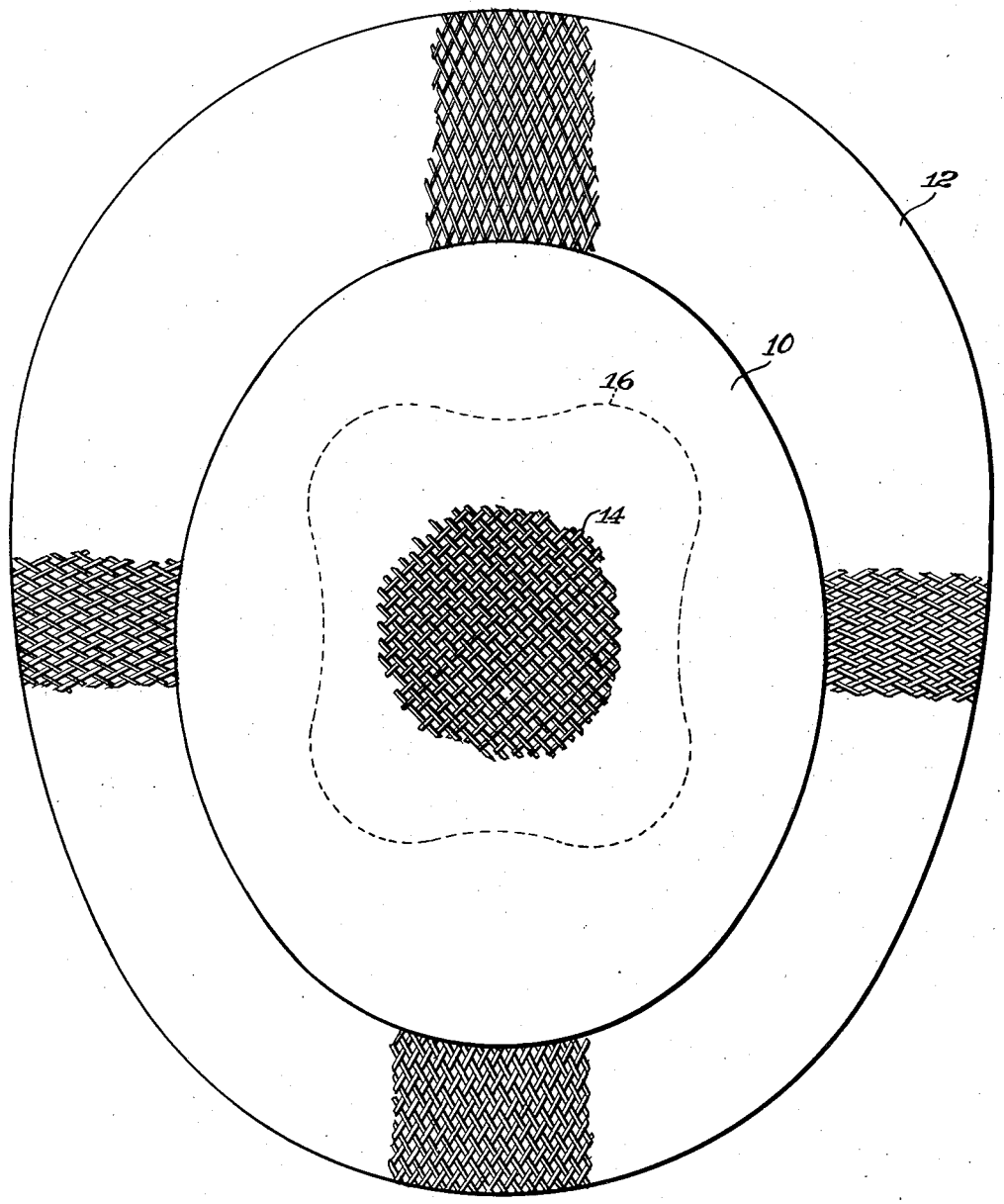

April 26, 1938.                J. B. DYM                    2,115,065
                               HEADGEAR
                         Filed Oct. 15, 1936          3 Sheets-Sheet 1

April 26, 1938. J. B. DYM 2,115,065
HEADGEAR
Filed Oct. 15, 1936 3 Sheets-Sheet 2

WITNESSES
A. B. Wallace.
A. H. Oldham

INVENTOR.
Joseph B. Dym
BY Brown, Critchlow & Hick
his ATTORNEYS.

April 26, 1938.  J. B. DYM  2,115,065

HEADGEAR

Filed Oct. 15, 1936  3 Sheets-Sheet 3

WITNESSES  INVENTOR.
A. B. Wallace  Joseph B. Dym
A. H. Oldham  BY Brown, Critchlow & Hicks
  his ATTORNEYS.

Patented Apr. 26, 1938

2,115,065

UNITED STATES PATENT OFFICE 2,115,065

HEADGEAR

Joseph B. Dym, Pittsburgh, Pa., assignor to Mine Safety Appliances Company, Pittsburgh, Pa., a corporation of Pennsylvania Application October 15, 1936, Serial No. 105,743

2 Claims. (Cl. 2—3)

This invention relates to head-gear and more particularly to protective head-gear for industrial use and to improved apparatus and methods for making the same.

Heretofore protective or safety head-gear has ordinarily been made from relatively rigid shock resisting materials and one popular type has been made of moldable plastic, such as phenol-formaldehyde resin, reinforced with fabric which is embedded in the plastic. Due to the shape of the ordinary head-gear whether in hat or cap form it is difficult to provide reinforcing fabric for head-gear without slitting and overlapping the fabric. One well-known form of head-gear is that disclosed in United States Patent No. 1,835,883 to J. M. Lewis, wherein the fabric reinforcing the plastic is in the form of one or more circular or oval pieces formed with radially extending slits to thereby produce a plurality of radially directed sector-shaped tabs. These tabs in the construction of the head-gear are folded down from the crown in slightly overlapping relation towards the rim of the hat to provide a head-gear which is entirely satisfactory and successful, and large numbers thereof have been made and sold and they have afforded satisfactory protection to the users. However, the overlapping tabs sometimes form pockets in which the moldable plastic of the head-gear collects during the molding operation to produce dark streaks or objectionable areas in the finished head-gear. Since the resin or plastic containing pockets are not secured directly by fabric they are sometimes liable to be chipped or knocked from the head-gear. A skilled operator during the manufacture of the Lewis type of head-gear can provide additional pieces of fabric which may largely avoid the formation of pockets but this adds to the material and labor costs of the head-gear.

In view of the foregoing and other difficulties attending the manufacture of protective head-gear wherein moldable plastic is reinforced by fabric folded or bent to head-gear form, I have proposed to make a protective head-gear from moldable plastic reinforced by a knitted or woven fabric of head-gear shape. This type of head-gear, disclosed and claimed in my pending application Serial No. 72,765, filed June 1, 1936, largely eliminates resin pockets and the resulting streaky appearance and possible weakness in the molded plastic head-gear and provides a high grade efficient and successful head-gear. However, such knitted or woven fabric reinforcing members must be fabricated to the shape of the part which they are to reinforce, and a variety of sizes and shapes are necessary for the production of different sizes and styles of head-gear.

It is the general object of my invention to avoid and overcome the foregoing difficulties of and objections to known protective head-gears and methods of making them by the provision of a molded plastic head-gear reinforced by one or more layers of open mesh fabric shaped directly from flat sheet form to head-gear form with an attendant pantographing of the open meshes of the layers of the fabric.

Another object of my invention is to provide methods and apparatus for rapidly and effectively producing an improved type of protective head-gear having a molded plastic body reinforced by fabric which is not slit, overlapped or knit to size.

The foregoing and other objects of my invention are achieved by the method of making a protective head-gear which includes the steps of coating one or more substantially flat sheets of open mesh fabric with a moldable plastic, building up a laminated body from the sheets if more than one sheet is to be employed, holding the edges of the laminated body or of the sheet against undesired movement with adjustable force, shaping the body or sheet with its edges held as described to head-gear form which results in pantographing of the open mesh fabric and thereafter effecting a set or cure of the body or sheet when in head-gear form.

The resulting head-gear of my invention comprises one or more layers of open mesh fabric coated with moldable plastic with the open meshes of the fabric defining substantially square meshes adjacent the top or crown of the head-gear and elongated or pantographed diamond-shaped meshes in the lower portion of the crown or at the brim of the head-gear with the elongated diamond-shaped meshes gradually merging into a square shape as they approach the top of the crown.

In order to practice my improved method and to obtain the protective head-gear of my invention I provide a female mold part and a complementary male mold part for shaping the head-gear. Each of the mold parts is jacketed for the circulation of curing fluid. Associated with the mold are adjustable pressure means for holding a relatively flat sheet or a laminated body of open mesh fabric over the opening of the female mold part, the means engaging with the fabric adjacent its edge so that upon movement of the mold parts together the fabric is shaped to head-gear form with the open meshes of the fabric pantographing where necessary and with the edges of the fabric sliding under the adjustable pressure means only when required to prevent tearing of the fabric.

Figure 2:
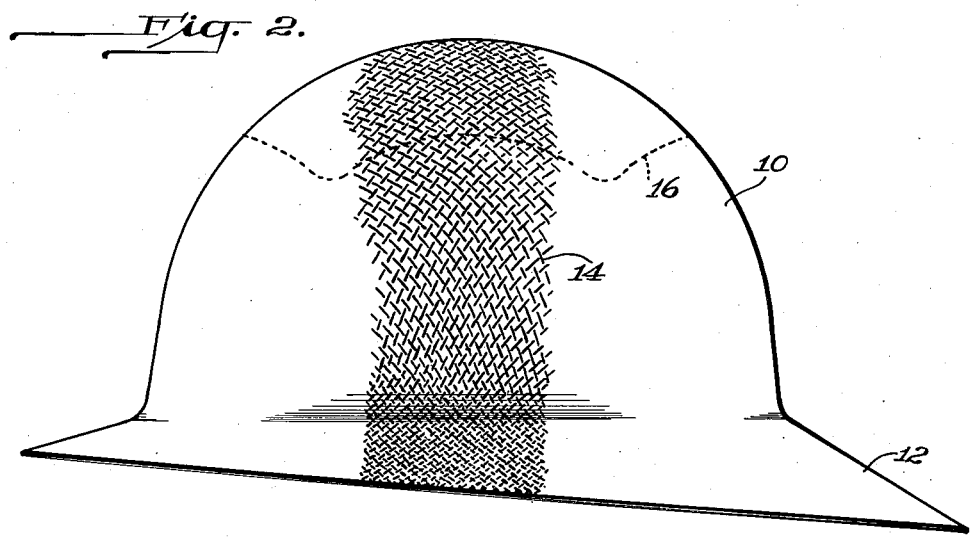
Figure 4:
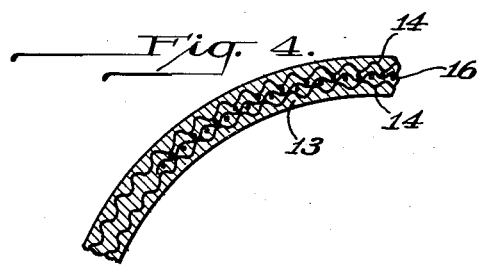
Figure 3:
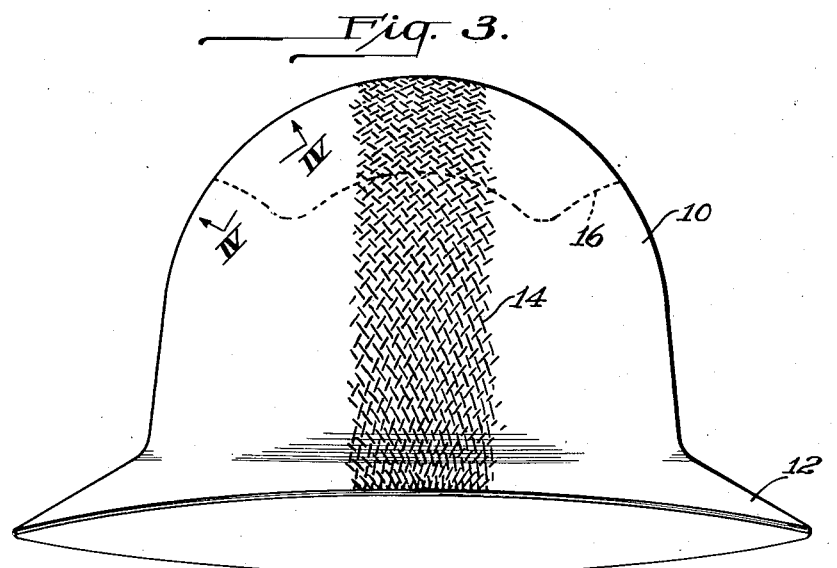
Figure 5:
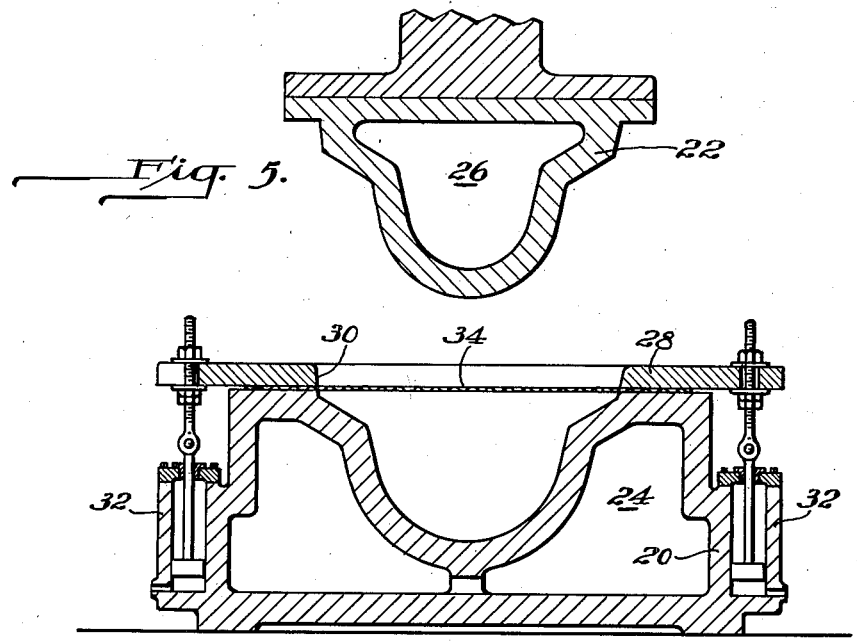
Figures 6, 7:
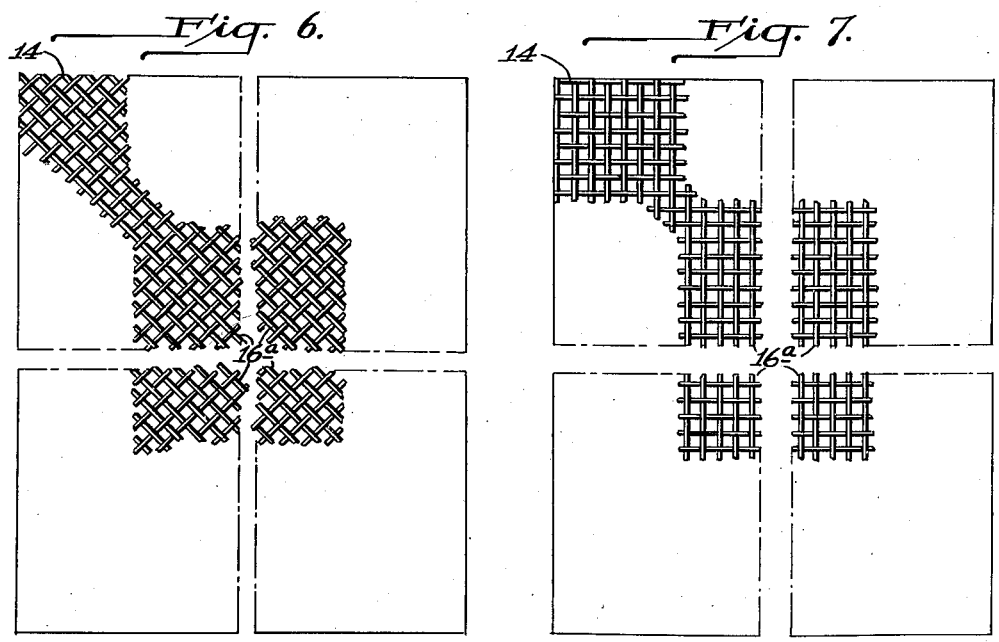

For a better understanding of the invention reference should be had to the accompanying drawings wherein Fig. 1 is a top plan view of a head-gear constructed in accordance with and embodying the principles of my invention; Figs. 2 and 3 are side and front elevations, respectively, of the head-gear of Fig. 1, but are on a smaller scale than Fig. 1; Fig. 4 is an enlarged fragmentary sectional view taken on line IV—IV of Fig. 3; Fig. 5 is a diagrammatic vertical sectional view of the apparatus for manufacturing my improved head-gear; and Figs. 6 and 7 are plan views of open mesh fabric employed in the invention.

While the principles of my invention are broadly applicable to the manufacture of head-gear of various types, such as police, army, sun-protecting and like head-gears, they are particularly adapted to the manufacture of protective head-gear for industrial use, as for example by miners or firemen. Accordingly a typical head-gear of the helmet type as employed by industrial workers to protect their heads against falling objects, steam, electrical or other injury has been selected for purposes of illustration and will be described. Referring to Figs. 1 to 4 the head-gear of the helmet type illustrated includes a crown portion 10 formed with an integral brim 12. The helmet is made from moldable plastic 13 reinforced with open mesh fabric 14.

Various plastics are known which are suited for use in the practice of my invention. These include, among others, plastics from both thermo-set and thermo-plastic groups, as for example compounded from rubber, casein or cellulose, numerous examples of which are known, are available for commercial use. Preferably, however, the head-gear of my invention is made from plastic of the type comprising organic condensation products which are commonly termed synthetic resins or resinoids, and which are initially plastic and moldable and which after being subjected to heat and pressure become very hard, infusible, non-conducting, insoluble in organic solvents, dilute acids, and alkali, and inert to steam. Of these materials the best known and one that is particularly advantageous is that resulting from the condensation of phenol and formaldehyde, although other types may be used of which phenol-furfural and urea-formaldehyde resinoids are examples.

The open mesh fabric 14 comprises any woven material having open meshes therein which are capable of pantographing or changing shape as hereinafter described. Wire fabric or screen may be employed but I preferably use open mesh cord fabric having from approximately six to fifteen meshes per inch and made from relatively pliable cord.

The plastic body 13 of the head-gear has the reinforcing fabric embedded therein as will be seen from Fig. 4. The fabric 14 of the cord may not only be embedded in the moldable plastic but also may be impregnated thereby. One or more layers of open mesh fabric 14 are employed in the ordinary head-gear but I preferably use at least two layers of fabric which may be reinforced at the top of the crown of the head-gear by a patch of wire fabric 16 positioned between plies of the fabric 14. The typical contour for the patch 16 is shown by the dotted lines in Figs. 2 and 3. A perforated steel plate or other means for reinforcing the crown or other portions of the head-gear may be utilized instead of the wire fabric 16 as will be understood. Likewise I contemplate weaving wire into the open mesh fabric 14 in order to provide reinforcement for the head-gear and this modification is shown in Fig. 7 wherein the numeral 16a indicates the woven-in wire. The patch 16a can be of a desired size as will be understood.

An important part of my inventive concept is the use of one or more unslit and unfolded sheets or layers of open mesh fabric 14 which are shaped during the molding of the head-gear from substantially flat form to head-gear form with the cords of the open mesh fabric distributing themselves during the shaping operation to pantograph the open meshes of the fabric in a manner illustrated in Figs. 1 and 3 and now to be described.

In Fig. 1 the plan view of my improved head-gear illustrates that at the top of the crown 10 of the head-gear the meshes of the fabric 14 are substantially square and unaltered with the cords of the fabric preferably though not necessarily extending at substantially forty-five degrees to the longitudinal axis of the head-gear. However the fabric 14 forming the lower crown and brim portions of the head-gear is pantographed so that the meshes of the fabric are of elongated or diamond shape with the longest dimension of the diamond extending at the four places indicated substantially radially to the head-gear. Figs. 2 and 3 further indicate that the change in shape of the open meshes of the fabric is a gradual one between the upper part of the crown and the lower part of the crown and the brim portion of the head-gear. In other words the diamond-shaped or elongated meshes of the brim and lower portion of the crown gradually change to a square mesh shape as they approach the crown of the head-gear.

The resulting head-gear provides a molded plastic body evenly reinforced by fabric which is unslit and unfolded so that resin pockets and weaknesses in the head-gear are avoided. The article is inexpensively and rapidly made as hereinafter described and is uniformly strong while light in weight.

Referring to Figs. 5 to 7 one type of apparatus for making my improved head-gear is illustrated and comprises a female mold part 20 and a complementary male mold part 22 mounted for movement to and from the female mold part and adapted to shape and cure a moldable plastic head-gear therein. The mold parts are suitably jacketed as at 24 and 26 for the reception of steam or other fluid adapted to effect a cure or vulcanization of the moldable plastic operated on in the mold. Removably mounted upon the upper surface of the female mold part 20 is a plate 28 having a central aperture 30 through which the male mold part 22 is adapted to pass. Air cylinders or other adjustable pressure means 32 are provided to clamp the plate 28 against the female mold part with an adjustable force. As will be seen in Fig. 5 the plate 28 serves to clamp a sheet or a plurality of laminated sheets of fabric 34 coated with moldable plastic over the opening of the female mold part. The fabric 34 may be cut on the bias or not as desired or a plurality of sheets or layers of fabric coated with moldable plastic and built up into a laminated body may be provided with different cuts upon different layers of the fabric. For example, in Fig. 6 I have illustrated a sheet of bias cut fabric adapted to be employed in the practice of my invention. Fig. 7 is a view of an open mesh fabric sheet which has not been cut upon the bias, but which I may also employ. Preferably fabric cut on the bias and built up into a laminated body of at least two layers is used however.

In the practice of the method of my invention one or more large sheets of open mesh fabric are coated with moldable plastic which operation may be performed by a calender, or doctor bar or by merely pressing formed sheets of moldable plastic upon opposite sides of a sheet of open mesh fabric. The resulting sheet or sheets are cut to size for a particular head-gear and preferably are built up into a laminated body of say two or four individual sheets of fabric although broadly I contemplate forming a head-gear of a moldable plastic body reinforced by a single sheet of open mesh fabric. The substantially flat body or sheet of moldable plastic reinforced with open mesh fabric is then placed against the upper surface of the female mold part 20, the plate 28 is dropped down in position to grip the body or sheet around its edges with an adjustable pressure dependent of course upon the force of the air cylinders 32. The male mold part 22 is then moved towards the female mold part and engages with the sheet or laminated body 34 to shape it to head-gear form. In this operation the open meshes of the individual fabric sheet or sheets change shape or pantograph as above described so that without slitting or overlapping the flat fabric is almost instantaneously shaped to head-gear form. In this shaping operation the edges of the sheet or laminated body pull out some from beneath plate 28 but the tension on the air cylinders 32 is such that the yielding movement of the fabric occurs only just before the sheet or body must yield or cause breakage of the fabric therein.

Once the mold parts are in complementary position and the sheet or laminated body 34 has been shaped to head-gear form heating or other fluid is passed through the chambers 24 and 26 of the mold parts to effect a vulcanization or cure of the shaped sheet or laminated body. After the cure has been effected the male mold part 22 and the plate 28 are removed and the finished head-gear is taken from the mold, its brim is trimmed to shape and it is provided with a head-band in accordance with known practice.

From the foregoing it will be seen that the objects of my invention have been achieved by the provision of an improved head-gear and means and methods for making it. The head-gear is particularly adapted for safety or protective use but can be employed as a cap, hat, or helmet for substantially any use dependent of course upon the moldable plastic employed, the thickness and size of the head-gear, the character of the reinforcing fabric, etc. The head-gear is of uniform appearance and while light is strong and sturdy and in the particular embodiment described is well adapted to resist impacts and blows without failure. Folds in the fabric reinforcing means are avoided as are resin pockets or streaks.

My improved method is rapid and effective and results in a considerable saving of time, labor and materials over known methods. The apparatus I provide is inexpensive and is easily operated by the ordinary workman without particular skill.

While in accordance with the patent statutes, I have illustrated and described one embodiment of my invention, it should be understood that the invention is not limited thereto or thereby but is defined in the appended claims.

I claim:

1. A protective head-gear comprising a crown and brim of relatively stiff, shock-resisting molded plastic; open mesh cord fabric reinforcing the plastic of the crown and brim, said fabric comprising at least one sheet of substantially oval configuration shaped from the flat to head-gear form and in which all of the cords extend continuously substantially from edge to edge of the head-gear, the cords of the fabric extending at substantially forty-five degrees to the longitudinal axis of the head-gear and defining substantially square meshes adjacent the top of the crown and elongated or pantographed diamond-shaped meshes in the brim and lower portions of the crown, the elongated diamond-shaped meshes gradually merging into a square shape as they approach the top of the crown.

2. A protective head-gear comprising a crown of relatively stiff, shock-resisting molded plastic; open mesh cord fabric reinforcing the plastic of the crown, said fabric comprising at least one sheet shaped from the flat to head-gear form and having all cords extending continuously substantially from edge to edge of the head-gear, the cords of the fabric defining substantially square meshes adjacent the top of the crown and elongated or pantographed diamond-shaped meshes in lower portions of the crown, the elongated diamond-shaped meshes gradually merging into a square shape as they approach the top of the crown.

JOSEPH B. DYM.